May 24, 1955 — H. T. KRAFT — 2,708,994
EXPANDED CLUTCH
Filed March 23, 1951 — 3 Sheets-Sheet 1

INVENTOR
Herman T. Kraft
BY Evans + McCoy
ATTORNEYS

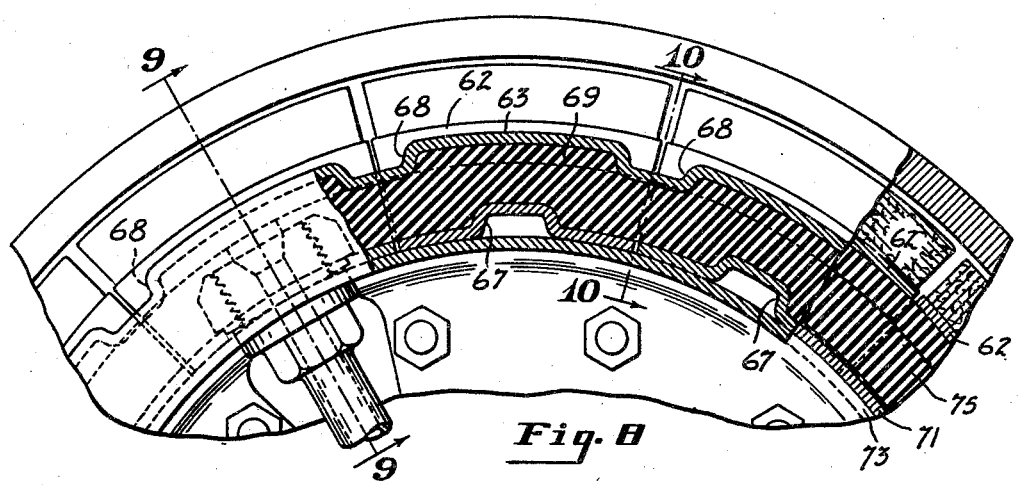
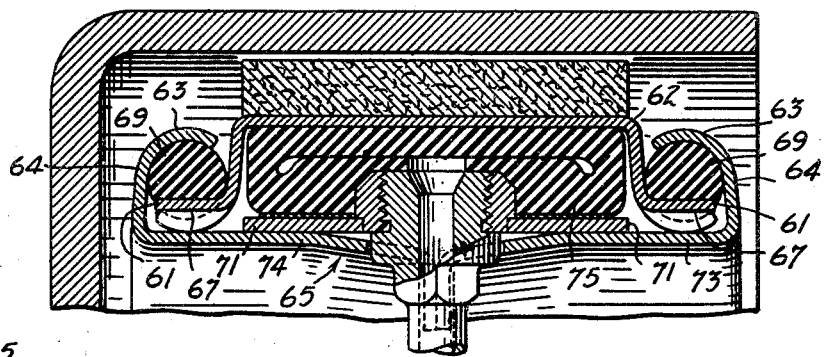
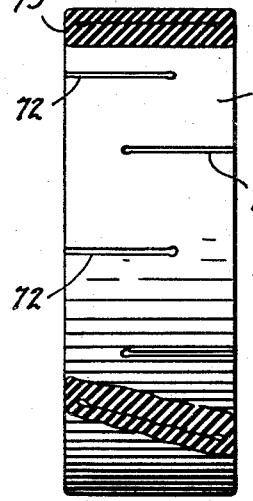
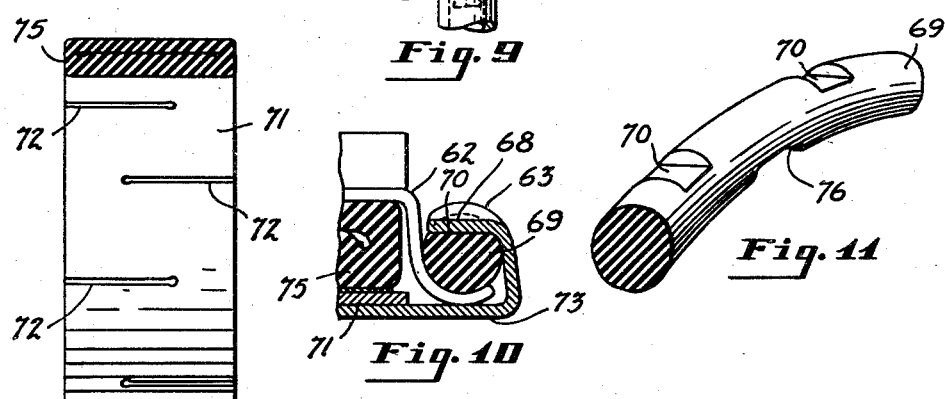
INVENTOR
*Herman T. Kraft*
BY *Evans & McCoy*
ATTORNEYS United States Patent Office 2,708,994
Patented May 24, 1955

2,708,994
EXPANDED CLUTCH

Herman T. Kraft, Akron, Ohio, assignor to The General Tire and Rubber Company, Akron, Ohio, a corporation of Ohio Application March 23, 1951, Serial No. 217,095

10 Claims. (Cl. 192—88)

This invention relates to torque transmitting devices and more particularly to pneumatic expanding clutches for heavy machinery and prime movers.

Pneumatic expanding clutches generally comprise an outer drum or cylinder attached to one shaft and an inner drum cylinder attached to the other shaft with segmental friction blocks around the circumference of the inner cylinder. The segmental friction blocks are forced into engagement with the inner surface of the outer cylinder by inflating a pneumatic tube disposed inside the friction blocks on the inner cylinder.

A persistent problem in the operation of these clutches has been the disengagement of the friction blocks from the outer cylinder while the two cylinders are engaged and are rotating together at high speed. Difficulty developes while the inner member is rotating because the centrifugal forces acting on the friction blocks tend to keep them in the engaged position and it is difficult to overcome these forces and to disengage the blocks.

One object of the present invention is to provide means for disengaging the friction blocks from the outer cylinder.

Another object of this invention is to provide a torque transmitting device in which substantially all of the torque vibrations and surges are absorbed in transmission.

Still further objects and advantages relate to simplicity in design, economy in manufacture, and easy repair and replacement of broken parts.

Additional features will become apparent from the following description made in connection with the accompanying drawings in which:

Fig. 8 is a side cross-sectional view of the clutch taken through the center of the support for the rubber annuli.

Fig. 9 is a cross sectional view taken along line 9—9 of Fig. 8.

Fig. 10 is a fragmentary cross-sectional view taken along line 10—10 of Fig. 8.

Fig. 11 is a perspective view of the rubber annulus used with the modification of Fig. 8; and Fig. 12 is a cross-sectional view of the steel ring used with the modification of Fig. 8.

Figure 1:
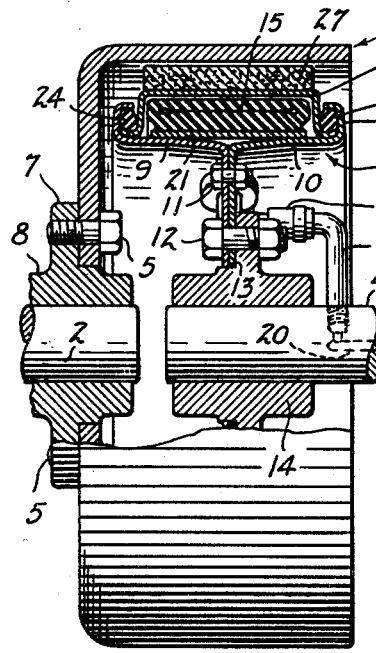
Figure 1 is a front elevational view, partially in cross-section, showing the clutch of the present invention with an outer cylinder attached to the drive shaft and an inner cylinder with the friction blocks and pneumatic tube on the circumference thereof attached to a separately driven shaft.

The clutch of the present invention comprises an outer cylinder attached to one shaft and an inner cylinder attached to the other shaft. One shaft serves as the driving or power shaft and the other shaft serves as the driven shaft. Disposed around the circumference of the inner drum is an annular gland or pneumatic tube and over this gland is disposed a series of covers with friction blocks attached thereto. Integral with the covers are flanges or supporting means which support rubber annuli disposed thereon. Concentric with said annuli are outer restraining portions or bands.

When the gland expands it forces the covers and friction blocks against the inner surface of the outer cylinder and engages the clutch. At the same time, it places the annuli in compression between the flanges and restraining band. Thus, when the clutch is deflated, the annuli force the covers away from the outer cylinder against centrifugal forces and disengage the clutch.

Referring particularly to Figs. 1 to 4, the clutch comprises an outer cylinder or drum 1 attached to shaft 2 and an inner cylinder or drum 3 attached to shaft 4. The outer drum 1 is attached by bolts 5 (Fig. 1) to a shoulder 7 of hub 8 which is, in turn, keyed or shrunk onto the drive shaft 2. The shaft 2 connecting with the outer drum is usually employed as the drive shaft and referred to as such even though the clutch operates using either shaft as the drive shaft.

The inner drum 3 of the species of Figs. 1 to 4 comprises a pair of complementary dished or companion members 9 and 10 which are bolted back to back by bolts 11. These members are circular, with flanged portions extending at approximately right angles on either side out from the central plane portion so that when placed back to back these flanged portions form the circumference of the inner drum 3. The drum 3 is in turn bolted by bolts 12 to the shoulder 13 of the hub 14 on shaft 4. Hub 14 is keyed or shrunk fit onto the shaft 4.

Around the circumference of the inner drum is disposed the pneumatic tube or gland 15. This is of medium-hard rubber and is inflatable with gas or hydraulic fluid through an inflation means or valve assembly. The inner circumference of the tube may be vulcanized or cemented to the inner drum or not, depending upon the modification of this invention employed. The assembly or inflation means comprises valve stem 17 connecting to a rubber hose or connection 18 (Fig. 1) which in turn connects to elbow 19. Elbow 19 is tapped into the shaft 4 and connects with a bore hole 20 which extends the length of the driven shaft to a loose collar (not shown) through which the air pressure is supplied.

A steel band 21 (Fig. 3) may be disposed between the gland 15 and the inner drum 3 to give a regular surface to which the tube may be bonded. The complementary inner drum members 9 and 10 have a slight outward lift or taper so that they make an angle greater than ninety degrees with the vertical and are not exactly at right angles. Thus, when the close fitting steel band 21 is placed between the inner drum members and these members are drawn together by bolts 11, the flanged portions wedge up against the steel band and lock it securely in place. If desired, the steel band may also be bolted or riveted to the flanged portions to secure it to the inner drum.

Disposed around the circumference of gland 15 are a series of covers or saddle pieces 22 with spaced side portions extending over the side walls of the inflation gland in embracing relation thereto and terminating in integral angularly disposed flanges 23. The covers 22 are each channel shaped in cross-section with the flanges 23 extending axially, or substantially so, in opposite directions and substantially in the plane of the gland base. The flanges 23 form a rest or support for the rubber annuli 24. Each of the restraining flanges is transversely curved in the provision of a circumferential channel into which a portion of one of the annuli 24 is retentively seated.

Figure 2:
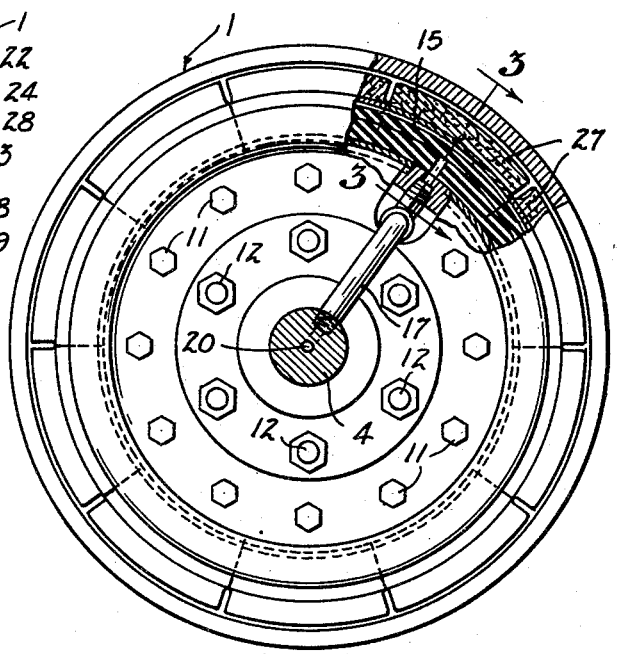
Fig. 2 is a side elevational view of Figure 1 partially in cross-section, showing inner cylinder construction and the disposition of the segmented friction blocks around the circumference thereof.

Fastened by rivets 25 or otherwise attached to each cover is a friction block or clutch shoe 27. The friction blocks 27 and covers 22 are segmental about the circumference of the inner cylinder and loosely abut as shown in Fig. 2. The friction blocks may be made of any conventional molded brake compound such as asbestos or sintered metal.

The flanged portions of the complementary inner drum members 9 and 10 are characterized by annular clamping portions or channel portions 28 (Fig. 3) extending radially outward from the flanged portions and centrally directed toward one another so that they form a guide or clamp for rubber annuli 24 to be described hereinafter. The annular channel portions or C-shaped clamping portions 28 are thus formed integrally with the flanged portions of the drum members.

The outer circumference of the confronting channel portions forms an outer band or retaining means 29 for confining the rubber annuli from radially outward expansion. The bands 29 may be integral with channel portions 28 of inner cylinder 3 or may be separate from it as desired.

Figure 3:
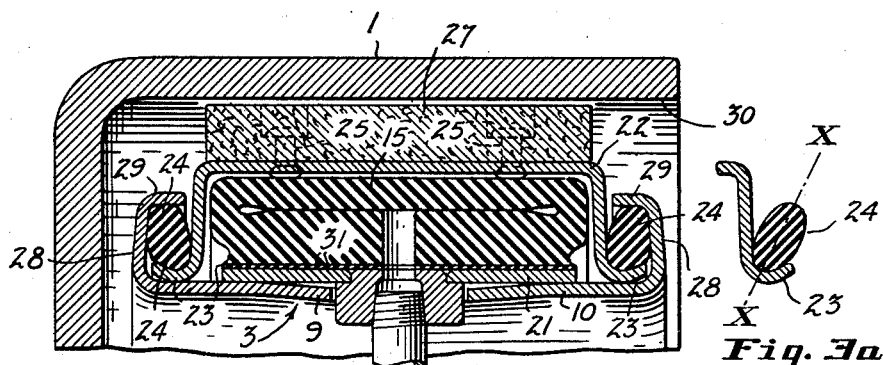
Fig. 3 is a sectional enlargement of Fig. 2 taken along line 3—3 showing the clutch disengaged and the pneumatic tube in the deflated position.
Figure 3A:
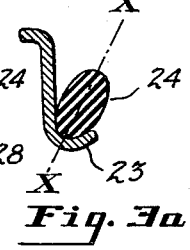
Fig. 3A is a detail from Fig. 3 showing how the rubber annulus rests on its support prior to assembly.
Figure 5:
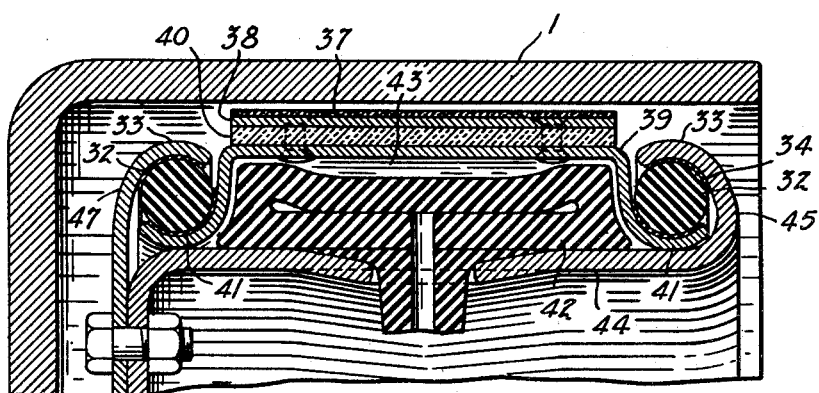
Fig. 5 is a sectional enlargement taken similarly to the view of Fig. 3 illustrating a second modification of the present invention in which the rubber annuli are round in cross-section and transmit substantially all of the torque.

Intermediate the axially extending shoulder portions or flanges 23 on the covers 22 and the outer band or restraining portion 29 of the annular channel portions or C-shaped clamping portions 28 of the inner cylinder rest two rubber annuli 24. In other words, the annuli rest between seats or flanges on the friction block assembly and seats on the inner drum. These annuli or cushions 24 are of medium to medium-hard rubber and are circular with oval or round cross-sectional shapes, as shown in Figs. 3 and 5. Rubber such as used in the manufacture of conventional inner tubes for pneumatic vehicle tires is satisfactory. The cross-sectional shape may vary with the relative size of the clamping portion 28 and the shoulder 23 between which annuli 28 are disposed. The controlling factor is that each annulus be of such bulk that it can compress in the space provided. Fig. 3A shows how the annulus is disposed on support 23 and is outwardly directed prior to assembly. Fig. 3 shows the same annulus assembled with cover 22.

When the pneumatic gland 15 is inflated (Fig. 4) the friction blocks 27 are raised or expanded into engagement with the inside surface 30 of the outer drum and, at the same time, the covers 22 expand outward to compress the rubber annuli 28 between cover flanges 23 and band retaining means 29. When the pneumatic gland is deflated (Fig. 3), the stored-up compressive forces in the rubber annuli exert inward or centrally directed forces on the block-carrying covers, which restoring forces overcome the existing outward centrifugal forces acting upon the friction blocks and thereby disengage the friction blocks. As previously noted, these outward centrifugal forces are developed by rapid rotation of the inner drum and tend to keep the friction blocks in the engaged position even though the pneumatic tube is deflated.

Figure 4:
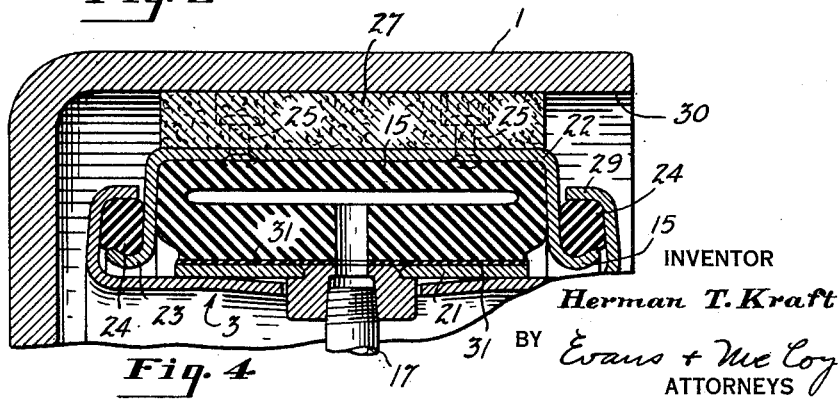
Fig. 4 is a sectional enlargement showing the clutch of Fig. 3 engaged and the pneumatic tube inflated.

As already described, Figs. 3 and 4 illustrate a rubber gland which, in its molded form or unstressed condition, is smaller in diameter than the steel band 21 over which it fits so that it is under tension when fit over the steel band 21 and bonded thereto by cement 31 thereto. The gland is inwardly recessed as shown to avoid pinching between the cover and inner drum during operation. In this modification (Figs. 3 and 4) the rubber annuli have an unstressed long or oval cross-sectional axis X—X as shown in Fig. 3A which gives the annuli a natural outward direction. The long cross-sectional axis of the annulus is greater than the distance intermediate the cover flanges and annular channel portions so that the annulus is in initial compression when assembled.

For assembly, the clamping portions 28 of the inner drum members 9 and 10 are fitted over the annuli and the flanged members are then drawn together about the inflation annulus and the covers. This causes the axis of the annuli to be forced or directed more towards the vertical and causes the annuli to compress and deform. Thus, the annuli are in a compressed state when the gland is deflated or, in other words, are in initial compression. The torque forces in this modification are transmitted both through the annuli in compression and through the rubber gland.

Fig. 5 illustrates a second modification of the invention. Here the rubber annuli 32 are substantially circular or round in cross-sectional shape and are cemented or bonded to the outer restraining means or band 33 and the flange supports 41 as shown. The annuli are cemented or bonded in place by cement or bonding agent 34 which may be continuous about substantially the entire circumferential extent of the annuli. The annuli thus are effective in carrying a portion of the torque load imposed on the device. The friction block of this modification comprises a layer of sintered metal 37 backed by a steel backing sheet 38 and separated from the cover 39 by asbestos or heat insulation 40. The rubber gland 42 has an unstretched circumference appreciably smaller than that of the drum so that the gland has to be stretched considerably to fit over the drum. For this reason, the outer gland circumference portion is in tension and tends to hug the drum and leave an air space 43 between the gland and cover. The gland should be stressed or stretched so that when the gland is deflated the gland circumference will hug the drum. In this way an air space 43 is provided to retard heat transfer and cool the gland and cover as the drum rotates rapidly after the gland has been exhausted and the shoes disengaged. Air flows in through the cracks between each segment, through air space 43, and out again.

This modification also features an alternative type of inner drum. This drum comprises a cylindrical member 44 formed around one edge with an integral, reversely-bent annular channel portion 45. A separate annular channel or clamping piece 47 is bolted to the opposite edge to form the facing channel portions. The radially outer portions of channel 45 and channel piece 47 form restraining means 33 for the rubber annuli 32. In this modification torque is transmitted to a great extent through the rubber annuli.

Figure 6:
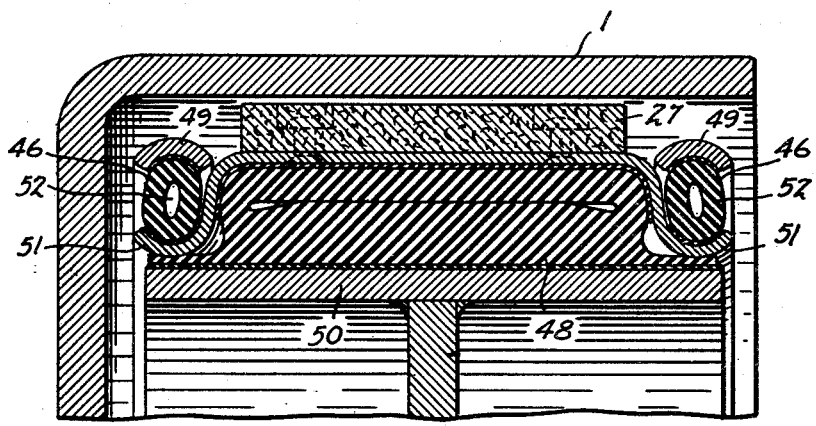
Fig. 6 is a sectional enlargement taken similarly to the view of Fig. 3 illustrating a third modification of the present invention in which the rubber annuli have hollow centers and the outer restraining band is free from the inner cylinder so that all torque is transmitted through the pneumatic tube.

Fig. 6 shows a third modification of my invention. Here rubber gland 48 is cemented directly to the inner drum without an intervening steel band or hoop. Restraining portions or bands 49 confine the annuli 46 and float free from the inner drum 50. These separate bands 49 perform functions similar to the restraining portions on the other modifications. This is, bands 49 are continuous rings which are disposed over the annuli and prevent them from radial expansion.

The axis of the rubber annuli 48 in this modification is centrally inclined to eliminate an interference or contact with the outer drum walls. The annuli are cemented with rubber cement to bands 49 and flanges 51. All the torque in this modification is transmitted through the rubber gland 48 and for this reason the gland is provided with a wide base and is cemented to the inner drum 50.

The annuli 46 in this modification are formed with a central hollow portion or inner hollow 52 which is circumferentially continuous about the entire extent of each annulus to provide for greater compressive movement and easier compression than is obtainable with solid rubber annuli.

Figure 7:
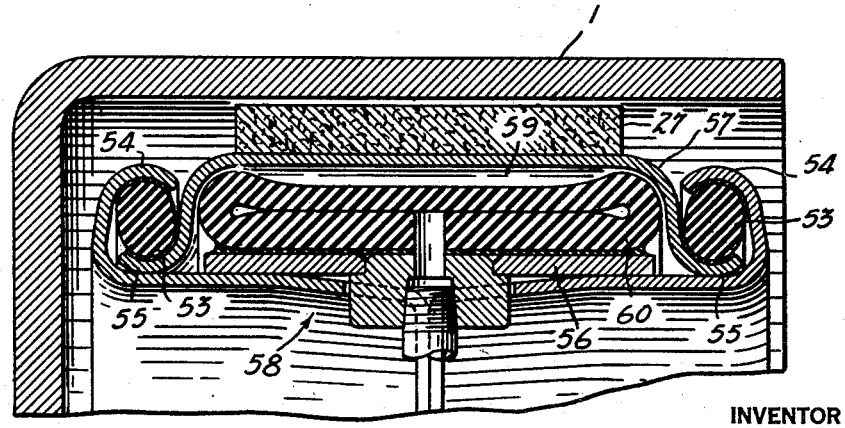
Fig. 7 is a sectional enlargement taken similarly to the view of Fig. 3 illustrating a fourth modification of the present invention in which the pneumatic tube collapses on deflation to give a cooling space intermediate the tube and friction blocks.

Fig. 7 shows a fourth modification of the present invention. Here the axes of the annuli 53 are outwardly directed and the annuli are cemented onto the outer restraining portions 54 and the flange supports 55 of the covers 57. The gland 60 is expanded and placed in tension over the steel band or base ring 56 and cemented thereto. As with the modification of Fig. 5, the gland diameter is substantially smaller than the inner drum diameter and it must be expanded considerably prior to placing it over the band 56. This places the gland in tension so that the outer portion or circumference tends to hug the inner drum 58. This action is strong enough to persist even when the drum is rotating rapidly and overcomes the counter-acting centrifugal forces tending to expand the gland 60 outward. In this way a cooling air space 59 is provided under the cover. This permits air to flow in the cracks between each segment through space 59 and out again and helps to cool the rubber tube and the cover portion so that the rubber does not deteriorate rapidly.

Figs. 8 to 12 illustrate still another modification of the present invention in which interlocking lug and socket formations resist relative circumferential movement of the annuli on the one hand and the rotatable member and friction block assemblies on the other hand. The flange 61 of the cover 62 and the restraining band 63 of the C-shaped clamping portion 64 on the inner cylinder 65 are both provided with regularly disposed circumferentially spaced corrugations or indentations 67 and 68 respectively. The annuli 69 are provided with correspondingly spaced notches 70 and 76 in the inner and outer faces to accommodate and receive the indentations 67 and 68 of the annuli supports. Notches 70 accommodate corrugations 68 and notches 76 accommodate corrugations 67. This formation is illustrated in Fig. 11. Fig. 8 shows the regular spacing of the corrugations 67 around the circumference of the flange 61 and corrugations 68 around the circumference of the band portion 63. The corrugations 67 and 68 are offset from one another in staggered relation so that the annuli 69 are not unduly weakened.

Fig. 9 is a cross-section taken through corrugation 67 of the flange 61 and Fig. 10 is a cross-section taken through corrugation 68 of C-clamp 64, both cross-sections illustrating the clutch construction.

In this modification, a steel band 71 with slits 72 is fit over the inner drum members 73 and 74 prior to assembly and the members bolted together to form the inner cylinder as previously explained. This expands the band and wedges it tightly with the inner cylinder. The gland 75 is expanded and fit over the band 71 prior to assembly.

An added advantage of the present invention is the fact that vibrations and surges are greatly reduced and loads are transmitted evenly through the clutch because all torque is transmitted through a plurality of rubber bodies having different harmonic periods. This gives a very smooth acting and superior clutch.

This clutch is intended for use with heavy stationary machinery but, of course, it can be adapted to numerous and various uses. The invention may be easily applied to other torque transmitting means such as brakes and similar appliances which are rotating and are engaged and disengaged by pneumatic means. It is not intended that the scope of the invention be limited solely to clutches.

What I claim is:

1. A torque transmitting device having concentric inner and outer rotatable cylinders, a pneumatic gland disposed over the outer circumference of said inner cylinder, a series of separate flanged covers disposed about the outer circumference of said gland, at least one friction block on each cover, retaining bands concentric with the flanged portions of said covers, and rubber annuli on either side of said covers supported on the inner circumference by the flange portions of said covers and confined on the outer circumference by said retaining bands, whereby when said pneumatic tube is inflated said friction blocks engage said outer cylinder and said annuli are compressed between the flanged portions of said covers and the retaining band so that when said tube is deflated said annuli expand inwardly against said retaining bands and overcome the centrifugal forces to disengage said friction blocks.

2. A torque transmitting device comprising an outer drum, an inner drum formed by bolted-together, dished members, a pneumatic gland over said inner drum, a plurality of abutting flanged covers about the outer circumference of said gland, at least one friction block on each cover, retaining bands concentric with the flanged portions of said covers, and rubber annuli on either side of said covers supported on the inner circumference by the flange portions of said covers and confined on the outer circumference by said retaining bands.

3. The torque transmitting device of claim 2 with a relatively wide band disposed intermediate the inner drum flanged members and the pneumatic gland and bonded tightly with said flanged members when assembled.

4. The combination of claim 2 in which the cross-sectional diameter of the rubber annuli is larger than the distance intermediate the flanged portions of the abutting flanged covers and the retaining bands, and in which the long cross-sectional axis of said annuli is directed outward so that when the annuli are disposed over the flanged portions of said covers and the dished members of the inner drum are clamped together, said annuli are placed in initial compression.

5. A torque transmitting device comprising inner and outer rotatable members having annular faces disposed in spaced confronting relation, a hollow expansible gland on the inner member, a cover extending across the gland and including a portion extending axially beyond the latter, an element carried by the inner member and having a face disposed in confronting spaced relation to the axially extending portion of the cover, a resilient deformable element interposed in the space between the confronting face of the inner member element and the cover portion, means for inflating the gland to bear against the cover and shift the latter radially outward toward the annular face of the outer member, and friction block means on the cover in position to engage the face of the outer member upon said outward shifting of the cover incident to gland inflation, the element of the inner member and the cover portion being arranged to compress the deformable element during inflation of the gland whereby the deformable element provides a restoring force to move the cover radially inward toward the inner member upon deflation of the gland.

6. A torque transmitting device comprising inner and outer rotatable members having annular faces disposed in spaced confronting relation, a hollow expansible gland on the inner member, a friction block assembly on the inner member and arranged to be shifted toward the outer member upon inflation of the gland, the block assembly and the inner member being formed with mutually confronting spaced seats disposed radially one within the other in a common plane substantially normal to the rotational axis of the members, the seats being arranged to move relatively toward one another upon said shifting of the assembly, a resilient deformable element disposed in the space between the seats, and means for inflating the gland, the seats being arranged to compress the deformable element during inflation of the gland whereby, upon deflation of the gland, the deformable element provides a restoring force to move the seats apart and retract the block assembly from the annular face of the outer member.

7. A torque transmitting device having concentric inner and outer rotatable drums, a pneumatic gland over the inner drum, inflation means for said gland, a series of saddle pieces over the outer circumference of said gland, said saddle pieces having integral flanges at each side thereof, friction blocks rigid with and over said saddle pieces, annuli retaining portions on the inner rotatable drum at a greater distance in a radial direction from the axis of rotation of the device than the flanges of said saddle pieces and concentric with the flanges of said saddle pieces, and rubber annuli intermediate and confined by the annuli retaining portions of said inner drum and the flanges of said saddle pieces.

8. The torque transmitting device of claim 7 in which the rubber annuli are cemented to the retaining portions and the flanges of the saddle pieces.

9. The torque transmitting device of claim 7 in which the pneumatic gland is tightly stretched onto the inner drum to provide an air space intermediate the outer circumference of the gland and the saddle pieces.

10. A torque transmitting device having concentric inner and outer rotatable drums, a pneumatic gland over the inner drum, inflation means for said gland, a series of saddle pieces over the outer circumference of said gland, said saddle pieces having integral flanges at each side thereof, friction blocks rigid with and over said saddle pieces, C-shaped clamping portions integral with said inner drum outside and concentric with the flanges of said saddle pieces, and rubber annuli intermediate and confined by said clamping portions and the flanges of said saddle pieces, the C-shaped clamping portions and the flanges of said saddle pieces being provided with a plurality of corrugations and the rubber annuli being indented to correspond to said corrugations.

References Cited in the file of this patent

UNITED STATES PATENTS

| | | |
|---|---|---|
| 2,100,462 | Wellman | Nov. 30, 1937 |
| 2,203,862 | Eason | June 11, 1940 |
| 2,246,979 | Kraft et al. | June 24, 1941 |
| 2,251,444 | Fawick | Aug. 5, 1941 |
| 2,331,180 | Gasser | Oct. 5, 1943 |
| 2,367,776 | Hollerith | Jan. 23, 1945 |
| 2,457,344 | Butler | Dec. 28, 1948 |